United States Patent
Barau et al.

(10) Patent No.: US 9,734,328 B2
(45) Date of Patent: Aug. 15, 2017

(54) DATUM READING ERROR DETECTION METHOD

(71) Applicant: Viaccess, Paris la Defense (FR)

(72) Inventors: Emmanuel Barau, Versailles (FR); Patrick Soquet, Paris (FR)

(73) Assignee: Viaccess, Paris La Défense (FR)

( * ) Notice: Subject to any disclaimer, the term of this patent is extended or adjusted under 35 U.S.C. 154(b) by 118 days.

(21) Appl. No.: 14/362,168

(22) PCT Filed: Nov. 29, 2012

(86) PCT No.: PCT/EP2012/073963
§ 371 (c)(1),
(2) Date: Jun. 2, 2014

(87) PCT Pub. No.: WO2013/079593
PCT Pub. Date: Jun. 6, 2013

(65) Prior Publication Data
US 2015/0040226 A1    Feb. 5, 2015

(30) Foreign Application Priority Data
Dec. 1, 2011    (FR) ..................... 11 61029

(51) Int. Cl.
*G06F 11/00*    (2006.01)
*G06F 21/55*    (2013.01)
(Continued)

(52) U.S. Cl.
CPC .............. *G06F 21/55* (2013.01); *G06F 11/08* (2013.01); *G06F 11/1076* (2013.01);
(Continued)

(58) Field of Classification Search
CPC ................... G06F 21/54; G06F 21/604; G06F 2221/2145; G06F 21/55; G06F 11/08;
(Continued)

(56) References Cited

U.S. PATENT DOCUMENTS

2005/0160310 A1    7/2005  Ellis et al.
2006/0053308 A1    3/2006  Zimmerman
(Continued)

FOREIGN PATENT DOCUMENTS

GB    2 404 261    1/2005
GB    2404261      1/2005
(Continued)

OTHER PUBLICATIONS

*Functional Model of Conditional Access System*, EBU Review, Technical European Broadcasting Union, Brussels, BE, n° 266, Dec. 21, 1995.

(Continued)

*Primary Examiner* — Kambiz Zand
*Assistant Examiner* — Abiy Getachew
(74) *Attorney, Agent, or Firm* — Occhiuti & Rohlicek LLP (57) ABSTRACT

A method for detecting an error in reading a data, includes in a step a) storing a first copy of the data item in a first area of an electronic memory and storing of a second copy of the data item in a second area. Step b) includes reading values of the first and second copies of the data item and in step c) there is a comparison of the read values of the first and second copies of the data item. In step d) if the read values of the first and second copies are identical, then no error is detected. In step e) if the read values of the first and second copies are different, then the method includes repeating steps b) and c). In step f), if the values read in step e) are identical, then an error in the reading of the data item is detected and, otherwise, no error is detected.

12 Claims, 3 Drawing Sheets

(51) Int. Cl.
*G06F 11/16* (2006.01)
*G06F 11/08* (2006.01)
*G06F 11/10* (2006.01)

(52) U.S. Cl.
CPC .......... *G06F 11/167* (2013.01); *G06F 21/554* (2013.01); *G06F 21/556* (2013.01); *G06F 2221/2143* (2013.01)

(58) Field of Classification Search
CPC .. G06F 11/1076; G06F 21/554; G06F 21/556; G06F 11/167; G06F 2221/2143; G07C 13/00; G01G 23/32; G01G 23/375; G06Q 10/10; G06Q 2230/00; H03M 13/09; H03M 13/15; H03M 13/1515; H03M 13/152; H04L 45/20; H04L 49/101; H04L 49/30; H04L 49/555
USPC .......................................................... 726/23
See application file for complete search history.

(56) References Cited

U.S. PATENT DOCUMENTS

2007/0033417 A1 2/2007 Gammel et al.
2008/0140962 A1* 6/2008 Pattabiraman ........ G06F 11/183
　　　　　　　　　　　　　　　　　　　　　　　　711/162
2009/0113546 A1* 4/2009 Kim .................... G06F 11/1068
　　　　　　　　　　　　　　　　　　　　　　　　726/22

FOREIGN PATENT DOCUMENTS

WO    2008/023297    2/2008
WO    WO2008/023297  2/2008

OTHER PUBLICATIONS

EBU Project Group B/CA, "Functional model of a conditional access system," EBU Technical Review Winter 1995.

* cited by examiner

DATUM READING ERROR DETECTION METHOD

RELATED APPLICATIONS

Under 35 USC 371, this application is the national stage of PCT/EP2012/073963, filed on Nov. 29, 2012, which claims the benefit of the Dec. 2, 2011 filing date of French application FR1161029, the contents of which are herein incorporated by reference.

FIELD OF INVENTION

The invention relates to a method for detecting an error in the reading of a data item and a method for protecting a security processor. The invention also relates to an information storage medium and a security processor for implementing these methods.

BACKGROUND

Known methods detect a reading error by performing the following steps:
a) storing of a first copy of the data item in a first area of an electronic memory and storing of a second copy of the data item in a second area of an electronic memory, in response to a request to read the data item:
b) reading of the values of the first and second copies of the data item in the first and second areas respectively,
c) comparing the read values of the first and second copies of the data item,
d) if the read values of the first and second copies are identical, then no error in the reading of this data item is detected.

An area of memory or memory area is an electronic memory or part of an electronic memory divided into several memory blocks. Each memory block is intended to contain a data item. Typically, a memory block is a page or a single multiple of a page. A page is the smallest number of octets that can be written in a single writing operation. Thus, even if the stored data item in a page has a smaller size than the page, the totality of the page is considered to be occupied by this data item and it is not possible to store any additional data in this page.

The prior art relating to these known methods is for example disclosed in the following patent applications: GB 2 404 261, US 2006 053308, WO 2008 23297, US 2007 0033417, US 2005 0160310, US2008/140962A1 and US2009/113546A1.

The known methods aim only to protect against the consequences of a fault of a memory block. Thus, if the values of the first and second copies are different, then an error is signalled and corrective measures are triggered. One of the conventional corrective measures consists of correcting the value of the stored data item. However, these methods also detect an error in the reading of the data item. In the case of an error in the reading of the data, the absence of equality between the values of the first and second copies of the data item does not stem from corruption of the data stored in the memory areas but from an error during the process of reading these data. Here, the terms corruption or corrupted data are used when the physically stored value of this data item is erroneous because of a fault in a memory block. Thus, although the stored values of the first and second copies are perfectly identical, in step c) above, it is observed that the values are different. For example, a reading error can be provoked by a disturbance of the signals of the reading bus or by a corruption of the copied data in a non-volatile memory after having been read in a non-volatile memory area.

The known methods do not distinguish between these two types of error and systematically launch the same corrective measure after the detection of an error. Typically, the corrective measure consists of correcting the erroneous value. However, in the case of a reading error, such a correction is useless and translates into a waste of computer resources such as the time for a microprocessor to implement this method.

In the field of security processors, there is also another good reason to distinguish between these two types of error. A security processor is an electronic processor that is reinforced to be as resistant as possible to hackers. It is therefore generally used to house confidential data. Now, a conventional attack against a security processor consists of corrupting the stored data to provoke an unpredicted behaviour of the security processor, which can reveal part or all of the confidential data that it contains. However, it is easier for the hackers to provoke a reading error than to corrupt stored data. When the hacker deliberately provokes reading errors by using voltage peaks or a laser beam or otherwise, it is said that the security processor is the victim of a reading attack. Thus, in the context of security processors, a reading error makes it possible to detect an attempt at cryptanalysis quite certainly whereas a fault in a memory block can be an accidental fault caused, for example, by aging.

SUMMARY

The invention aims to remedy this drawback. Its subject is therefore a method for detecting a reading error in accordance with claim 1.

The method above makes it possible to distinguish a reading error from an error caused by the corruption of the stored data, and thus to detect a reading error. Indeed, at the second iteration of the steps b) and c) of claim 1, the values of the first and second copies are necessarily different if at least one of these values is corrupted. Conversely, the identity of these values at the second iteration of steps b) and c) identifies an error in the reading of the data item with certainty.

Hence, it is possible to implement different appropriate measures for responding to a reading error or to a corruption of the stored data. For example, the fact of detecting a reading error makes it possible to avoid uselessly implementing measures aiming to correct stored data when the latter are not corrupted. Moreover, in the case of a security processor, the detection of a reading error makes it possible to trigger the implementation of countermeasures to prevent cryptanalysis.

The embodiments of this detection method can include one or more of the features of the dependent claims.

The embodiments of the detection method above furthermore have the following advantages:
the use of an error detecting code makes it possible to restore the functionality of the method for detecting a reading error even after a fault in a memory block,
the use of an error-correcting code makes it possible to restore the functionality of the method for detecting a reading error even after the values of the first and second copies of the data item have been corrupted while limiting the number of error-correcting codes stored,
the choosing of memory blocks in which to store a new data item only from among the memory blocks not stored as being faulty makes it possible to avoid reusing faulty memory blocks for the storing of data, the storing of a transformed value in the first memory area different from the stored value in the second memory area makes it possible to increase the probability that the values read for the first and second copies are different in the event of reading attacks.

Another subject of the invention is a method for protecting a security processor from a reading attack in accordance with claim 6.

Another subject of the invention is an information storage medium including instructions for the implementation of the detection or protection method above when these instructions are executed by an electronic computer.

Finally, another subject of the invention is a security processor in accordance with claim 8.

The embodiments of this security processor can include one or more of the features of the dependent claims.

The invention will be better understood upon reading the following description, given solely by way of a non-limiting example

BRIEF DESCRIPTION OF DRAWINGS

In these figures the same references are used to designate the same elements.

DETAILED DESCRIPTION

In the remainder of this description, the features and functions well known to those skilled in the art are not described in detail. Moreover, the terminology used is that of conditional access systems for multimedia content. For more information on this terminology, the reader is referred to the following document: "*Functional Model of Conditional Access System*", EBU Review, Technical European Broadcasting Union, Brussels, BE, n° 266, 21 Dec. 1995.

The invention applies in particular to the field of access control for the provision of paid multimedia content such as paid television.

It is known to broadcast several multimedia contents at the same time. To do so, each multimedia content is broadcast on its own channel. A channel typically corresponds to a television channel.

In this description, "multimedia content" more specifically denotes audio and/or visual content intended to be restored in a form that is directly perceptible and comprehensible to a human being. Typically, multimedia content corresponds to a series of images forming a film, a television program or some advertising. Multimedia content can also be an interactive content such as a game.

To improve the security and subject the visualization of the multimedia contents to certain conditions, such as the subscription to a paid membership for example, the multimedia contents are broadcast in a scrambled form and not in clear form.

More precisely, each multimedia content is divided into a series of cryptoperiods. During the whole duration of a cryptoperiod, the conditions of access to the scrambled multimedia content remain unchanged. In particular, during the whole duration of a cryptoperiod, the multimedia content is scrambled with the same control word. Generally, the control word varies from one cryptoperiod to the next.

Moreover, the control word is generally specific to a multimedia content, the latter being randomly or pseudo-randomly generated.

Here, the terms "scramble" and "encipher" are considered to be synonyms. The same applies for the terms "unscramble" and "decipher".

The multimedia content in clear form corresponds to the multimedia content before the latter is scrambled. The latter can therefore be made directly comprehensible to a human being without resorting to unscrambling operations and without its visualization being subject to certain conditions.

The necessary control words for unscrambling the multimedia contents are transmitted in a synchronized way with the multimedia contents. To do so, the control words are multiplexed with the scrambled multimedia content, for example.

To improve the security of the transmission of the control words, the latter are transmitted to the terminals in the form of cryptograms contained in ECMs (Entitlement Control Messages). Here, "cryptogram" denotes an information item insufficient in itself to retrieve the plain text control word. Thus, if the transmission of the control word is intercepted, the knowledge of the cryptogram of the control word alone does not make it possible to retrieve the control word enabling the unscrambling of the multimedia content.

To retrieve the plain text control word, i.e. the control word making it possible to directly unscramble the multimedia content, it must be combined with a secret information item. For example, the cryptogram of the control word is obtained by enciphering the plain text control word with a cryptographic key. In this case, the secret information item is the cryptographic key allowing this cryptogram to be deciphered. The cryptogram of the control word can also be a reference to a control word stored in a table containing a multitude of possible control words. In this case, the secret information item is the table associating a plain text control word with each reference.

The secret information item must be kept in a safe place. To do so, it has already been proposed to store the secret information item in security processors such as smartcards directly connected to each of the terminals.

Figures 1, 3:
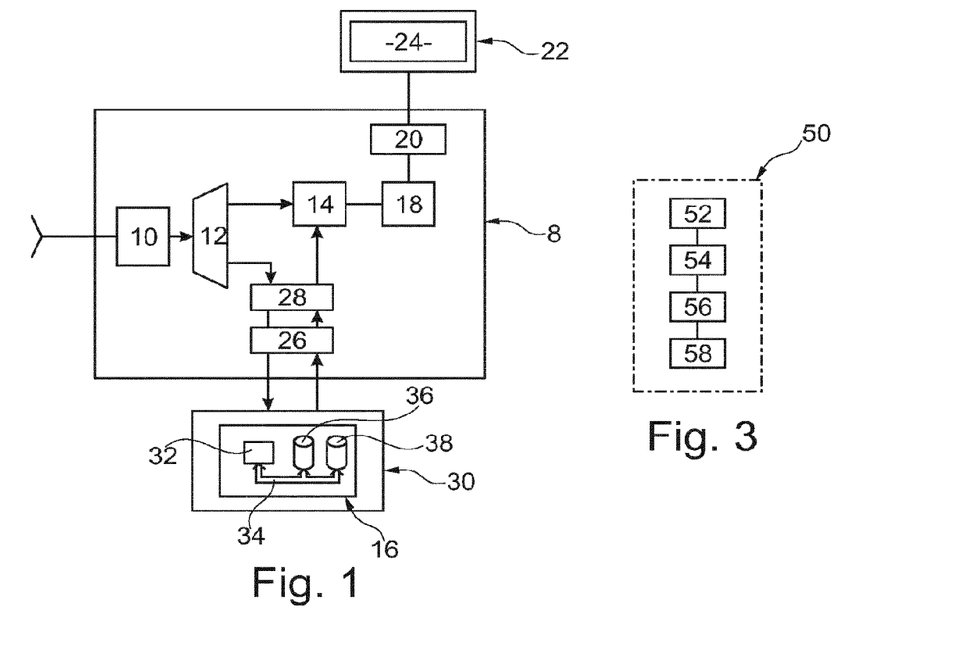
FIG. 1 is a schematic illustration of a reception terminal for scrambled multimedia content associated with a security processor.
FIG. 3 is a flowchart of a phase of writing data into the memory in FIG. 2.

FIG. 1 represents a terminal 8 intended to be used in such a conditional access control system. The terminal 8 unscrambles a channel to display it in clear form on a viewer.

The terminal 8 comprises a receiver 10 of broadcast multimedia content. This receiver 10 is attached to the input of a demultiplexer 12 which transmits the multimedia content to an descrambler 14 and the ECMs and EMMs (Entitlement Management Messages) to a security processor 16.

The descrambler 14 descrambles the scrambled multimedia content on the basis of the control word transmitted by the processor 16. The descrambled multimedia content is transmitted to a decoder 18 which decodes it. The decompressed or decoded multimedia content is transmitted to a graphics card 20 which drives the display of this multimedia content on a viewer 22 equipped with a screen 24. The viewer 22 displays the multimedia content in clear form on the screen 24. For example, the viewer 22 is a television, a computer or else a fixed or mobile telephone. Here, the viewer 22 is a television.

Typically, the interface between the terminal 8 and the processor 16 comprises a reader 26 managed by an access control module 28. Here, the reader 26 is a smartcard reader. The module 28 notably manages:

the transmission of the demultiplexed ECMs and EMMs to the processor 16, and the reception of the control words deciphered by the processor 16 and their transmission to the descrambler 14.

The processor 16 processes confidential information such as the cryptographic keys or the multimedia contents access entitlements. To preserve the confidentiality of this information, it is designed to be as robust as possible to attack attempts conducted by hackers. It is therefore more robust to these attacks than the other components of the terminal 8. In particular, the memories that it includes are only accessible to and used by this processor 16. Here, the processor 16 is the security processor of a smartcard 30.

The processor 16 notably comprises a programmable electronic computer 32 connected by way of an information transmission bus 34 to a volatile electronic memory 36 and to a non-volatile electronic memory 38.

The memory 36 is typically known by the acronym RAM (Random Access Memory). The memory 38 preserves the data that are stored even in the absence of power to the processor 16. Moreover, the memory 38 is a rewritable memory. Typically, it is an EEPROM (Electrically Erasable Programmable Read Only Memory) or a flash memory. The memory 38 contains confidential information required for the descrambling of the multimedia content. Here, it also contains the necessary instructions for executing the method in FIG. 4 or 5.

Figure 2:
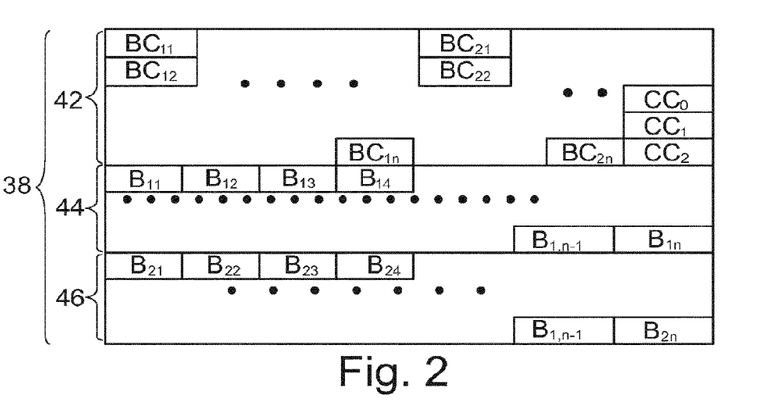
FIG. 2 is a schematic illustration of an organization of a memory of the security processor in FIG. 1.

FIG. 2 represents various areas of the memory 38 in more detail. Here, the memory 38 comprises the following memory areas:

a control area 42,
a first data storage area 44, and
a second data storage area 46.

Each memory area is defined by a start address and an end address. Here each area occupies a range of contiguous addresses in the memory 38. Each area is divided into several memory blocks. For example, the areas 42, 44 and 46 each contain over 100 or 400 memory blocks. The size of each memory block is several octets. Here, the memory blocks of these areas are all of the same size. For example, this size is greater than or equal to 64o or 128o. The sizes of the areas 44 and 46 are identical.

The area 44 is divided into P memory blocks $B_{1j}$ of the same size, where the index j identifies the start position of the block $B_{1j}$ with respect to the start address of the area 44.

The area 46 is also divided into P memory blocks $B_{2j}$ of the same size as the blocks $B_{1j}$. The index j identifies the start position of the block $B_{2j}$ with respect to the start address of the area 46. Here, to simplify the embodiment, the offset between the start of the block $B_{2j}$ and the start address of the area 46 is identical to the offset that exists between the start of the block $B_{1j}$ and the start address of the area 44. In these conditions, the blocks $B_{1j}$ and $B_{2j}$ are called "paired".

The area 42 comprises 2P memory blocks $CB_{ij}$ of the same size. Each block $CB_{ij}$ is associated with a block $B_{ij}$ of the area 44 or 46. The index i takes the value "1" to identify the area 44 and the value "2" to identify the area 46.

Here, each block $CB_{ij}$ notably comprises the following information:

the indication whether the associated block $B_{ij}$ is free, i.e. that it can be used to store a new data item, where applicable, the indication of the following memory block linked to this block $B_{ij}$ or the indication that this block $B_{ij}$ is the last block of a chain of linked blocks, an error detecting code $CD_{ij}$,
a covering mask $MR_{ij}$, and
a marker $MD_{ij}$ indicating whether or not the block $B_{ij}$ is faulty.

The code $CD_{ij}$ is constructed solely from the value of the data item contained in the block $B_{ij}$. This code $CD_{ij}$ adds enough redundancy to the data item contained in the block $B_{ij}$ for it to be possible to detect one or more erroneous bits in the value of the data item stored in this block.

For example, the code $CD_{ij}$ is a cyclic redundancy check better known by the acronym CRC. For example, the code $CD_{ij}$ is a CRC 32.

The covering mask $MR_{ij}$ is a value used to reversibly transform the value $D_{ij}$ of the data item to be stored in the block $B_{ij}$ into a transformed value $D'_{ij}$ that is stored in this block $B_{ij}$. This transformation is reversible so that, from the value of the mask $MR_{ij}$ and of the transformed value $D'_{ij}$, it is possible to retrieve the value $D_{ij}$ of the data item.

The marker $MD_{ij}$ makes it possible to memorize whether or not the block $B_{ij}$ is faulty. A faulty block $B_{ij}$ is for example a memory block including information bits whose values can no longer be rewritten or modified, which leads to the appearance of errors in the stored value in this memory block.

The area 42 also comprises error-correcting codes $CC_0$, $CC_1$ and $CC_2$. The code $CC_0$ is constructed from the content of the areas 44 and 46. It adds enough redundancy to the content memorized in the areas 44 and 46 for it to be possible not only to detect but also to correct one or more erroneous bits of the data stored in these areas 44 and 46. Similarly, the codes $CC_{1j}$ and $CC_{2j}$ add enough redundancy to the content of the areas 44 and 46, respectively, to make it possible to correct k erroneous bits in the areas 44 and 46 respectively, where k is a natural integer greater than or equal to one, and, preferably, greater than or equal to five or ten. Contrary to the code $CC_0$, the codes $CC_{1j}$ and $CC_{2j}$ only allow erroneous bits to be corrected in the areas 44 and 46 respectively. For example, these error-correcting codes are Reed Solomon codes.

FIG. 3 represents a phase 50 of storing a confidential data item in the memory 38. The confidential data item is typically a cryptographic key for deciphering control words or access entitlements authorizing, or not authorizing, the access and the unscrambling of multimedia contents.

If the size of the data item is greater than the size of a memory block, then the data item is first divided into several portions, each of a size smaller than the size of a memory block, in order to arrive at the case of a data item having a size that is smaller than the size of a memory block. In this case, the various portions of the same data item are for example chained together by indicating in each block $BC_{ij}$ the address of the following memory block.

Initially, in a step 52, the computer 32 chooses from among the various memory blocks of the areas 44 and 46 a pair of memory blocks $B_{ij}$ satisfying the following conditions:

the blocks $B_{1j}$ and $B_{2j}$ are paired,
the blocks $B_{1j}$ and $B_{2j}$ are free, and
the blocks $B_{1j}$ and $B_{2j}$ are not marked as being faulty.

The computer 32 verifies that the chosen blocks $B_{1j}$ and $B_{2j}$ are free and not faulty on the basis of the information contained in the blocks $BC_{1j}$ and $BC_{2j}$ of the control area 42.

In the following text, the value of the data item to be stored in the blocks $B_{1j}$ and $B_{2j}$ is denoted, respectively, $D_{1j}$ and $D_{2j}$. These values are identical.

In a step 54, the computer 32 computes the new value of the codes $CD_{1j}$ and $CD_{2j}$ making it possible to detect an error, in the values $D_{1j}$ and $D_{2j}$ respectively. In this step 54, the computer 32 also computes the new values of the error-correcting codes $CC_0$, $CC_1$ and $CC_{2j}$ and stores them in the area 42.

The new values of the codes $CD_{1j}$ and $CD_{2j}$ are stored, in the blocks $BC_{1j}$ and $BC_{2j}$ respectively.

The computer 32 also stores in its blocks $BC_{1j}$ and $BC_{2j}$ an indication according to which the memory blocks $B_{1j}$ and $B_{2j}$ are no longer free.

Next, in a step 56, the values $D_{1j}$ and $D_{2j}$ are transformed, respectively, into values $D'_{1j}$ and $D'_{2j}$ as a function of the value of the masks, $MR_{1j}$ and $MR_{2j}$ respectively. The value of the masks $MR_{1j}$ and $MR_{2j}$ is contained in the blocks $BC_{1j}$ and $BC_{2j}$. The values of the masks $MR_{1j}$ and $MR_{2j}$ are different so that the transformed values $D'_{1j}$ and $D'_{2j}$ are different.

For example, the transformation is performed using the following relationship: $D'_{1j} = D_{1j} \oplus MR_{1j}$, where "$\oplus$" is the XOR operation.

Next, in a step 58, the values $D'_1$ and $D'_{2j}$ are physically stored, in the memory blocks $B_{1j}$ and $B_{2j}$ respectively. The phase 50 then ends.

Figure 4:
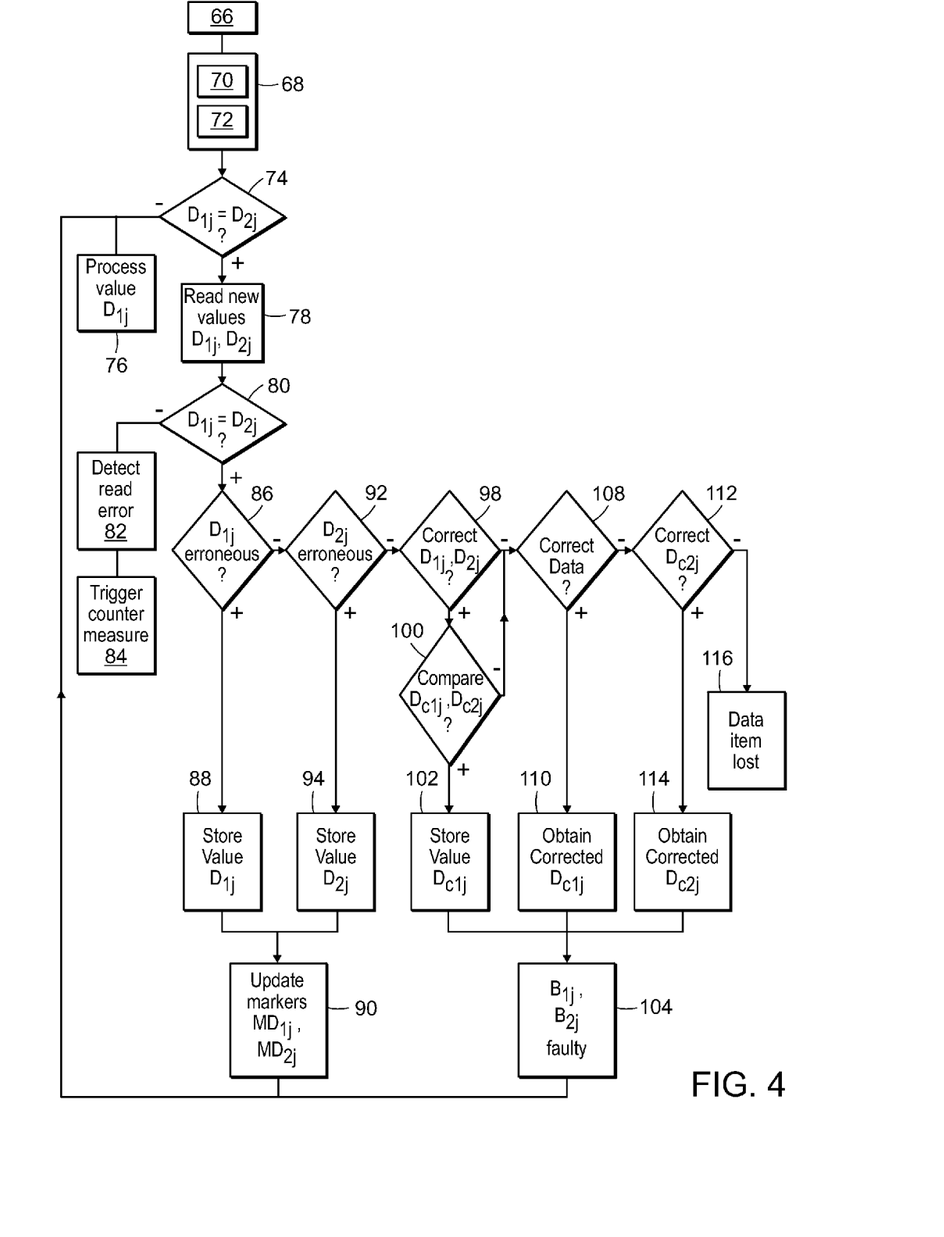
FIG. 4 is a flowchart of a method for protecting the security processor in FIG. 1.

When used, the processor 16 executes a program, for example for deciphering control words. Upon execution of this program, instructions require the reading of a data item stored in the memory 38, such as a cryptographic key or an access entitlement. The method in FIG. 4 is then executed.

Initially, in a step 66, the address of the memory block to be read is stored in a non-volatile reading address register. For example, this register is contained in the memory 38.

Next comes a step 68 of reading the data item in the memory 38 at the specified address. More precisely, in an operation 70, the values $D'_{1j}$ and $D'_{2j}$ contained in the paired memory blocks, $B_{1j}$ and $B_{2j}$ respectively, are read.

Next, in an operation 72, the computer 32 applies the inverse transformation to that applied in the step 56 of the method in FIG. 3. To do so, it uses the values of the masks $MR_{1j}$ and $MR_{2j}$. The values obtained by application of this inverse transformation for the values $D'_1$ and $D'_{2j}$ will subsequently be denoted values $D_{1j}$ and $D_{2j}$ respectively. Note that in the case of a reading error or corruption of the stored data, the values $D_{1j}$ and $D_{2j}$ are not necessarily identical to the values $D_{1j}$ and $D_{2j}$ stored in the writing phase 50.

In a step 74, the read values $D_{1j}$ and $D_{2j}$ are compared. If these values are equal, it is followed by a step 76 during which the program executed by the processor 16 processes the value $D_{1j}$ and continues its normal execution. For example, the computer 32 deciphers a control word using the value $D_{1j}$. In the step 76, no reading error is detected. Moreover, in the step 76, the reading address register is erased.

Conversely, if the read values $D_{1j}$ and $D_{2j}$ are not identical, then the program that is being executed is interrupted and a verification routine is executed by the computer 32. For example, the security processor is restarted and during the rebooting of the security processor, the verification routine is systematically executed if the reading address register is not empty. The verification routine can also be launched by a rerouting in the event of an error in the execution of the program.

Once this verification routine is launched, in a step 78, the computer 32 proceeds to a new attempt to read the data item stored in the memory 38. The new reading attempt consists in reading the data item corresponding to the address stored in the reading address register. The step 78 is for example identical to the step 68.

Next, in a step 80, the computer proceeds to a new comparison of the new values $D_{1j}$ and $D_{2j}$ read in the step 78.

If this time, the values $D_{1j}$ and $D_{2j}$ are identical, in a step 82, a reading error is detected. Indeed, the difference between the values $D_{1j}$ and $D_{2j}$ read in the step 68 does not stem from a corruption of the data stored in the memory 38. In fact, the detection of a reading error indicates in the case of a security processor, with a very high degree of probability, that the first reading attempt in the step 68 has failed because of a reading attack.

Hence, in response, in a step 84, the computer 32 triggers a countermeasure limiting the unscrambling of the multimedia contents. Here, it temporarily or definitively prevents the unscrambling of the multimedia contents using the processor 16. Typically, the deciphering of the control words is inhibited to do this.

More precisely, the countermeasure can be one of the following countermeasures:

the erasure of the confidential data contained in the memory 38 such as the cryptographic keys and the access entitlements, the triggering of the self-destruction of the processor 16 so as to render it definitively unusable, and the temporary or definitive cessation of deciphering of the control words.

In the step 84, if the processor 16 is still usable despite the implementation of a countermeasure, the reading address register is erased.

If the values $D_{1j}$ and $D_{2j}$ read in the step 78 are different, then that means that the stored data are certainly corrupted. It is therefore not a reading error.

In this case, in a step 86, the computer 32 verifies whether or not the value $D_{1j}$ is erroneous using the code $Cp_{1j}$.

If the value $D_{1j}$ is not erroneous, a step 88 follows of storing the value $D_{1j}$ in new paired memory blocks of the areas 44 and 46. For example, step 88 is performed in a way similar to the writing phase 50. Hence, it is the value stored in these new blocks that will be used during the next reading of the same data item.

Next, in a step 90, the markers $MD_{1j}$ and $MD_{2j}$ are updated to indicate and store in the memory that the preceding blocks $B_{1j}$ and $B_{2j}$ are faulty. Here, the block $B_{1j}$ is indicated as being faulty whereas the value that had been stored there was correct. This makes it possible to continue managing the pairing of the memory blocks in a simple way.

In the step 90, the reading address register is also erased. Next, the value $D_{1j}$ is processed by the program that continues its execution by the step 76.

If in the step 86, the value $D_{1j}$ is erroneous, there follows a step 92 of verifying whether the value $D_{2j}$ is erroneous or correct using the code $CD_{2j}$.

If the data item $D_{2j}$ is correct, there follows a step 94 identical to the step 88 except that it is the value $D_{2j}$ that is used instead of the value $D_{1j}$. The step 94 also continues by the step 90.

If the values $D_{1j}$ and $D_{2j}$ are erroneous, then, the computer continues to a step 98 during which it carries out a first attempt to correct these values using the code $CC_0$. This step 98 allows the computer 32 to correct k erroneous bits distributed in the areas 44 and 46. If there are less than k erroneous bits, the correction is then considered as having been successful. In this case, corrected values $D_{c1j}$ and $D_{c2j}$ are obtained for the values $D_{1j}$ and $D_{2j}$ respectively.

In this case, in a step 100, the computer 32 compares the values $D_{c1j}$ and $D_{c2j}$.

If the values $D_{c1j}$ and $D_{c2j}$ are identical, in a step 102, the value $D_{c1j}$ is stored in two new memory blocks, of the areas 44 and 46 respectively. This step is for example identical to the step 88 except that it is the value $D_{c1j}$ that is used instead of the value $D_{1j}$.

Next comes a step 104 during which the blocks $B_{1j}$ and $B_{2j}$ are marked as being faulty. This step 104 is for example identical to the step 90. The method next returns to the step 76.

If the values $D_{c1j}$ and $D_{c2j}$ are different or if the error correction with the code $CC_0$ has not succeeded, the computer 32 proceeds to a step 108 during which it tries to correct the data of the area 44 using the code $CC_1$. If the correction is successful, the computer 32 obtains a corrected value $D_{c1j}$ for the value $D_{1j}$. Next comes a step 110 identical to the step 102. The step 110 is followed by the step 104.

If the step 108 is fruitless and does not make it possible to correct the value $D_{1j}$, then the computer executes a step 112 during which it attempts to correct the value $D_{2j}$ using the code $CC_2$. If this step 112 succeeds, the computer 32 obtains a corrected value $D_{c2j}$. Next comes a step 114 identical to the step 94 except that it is the value $D_{c2j}$ that is used instead of the value $D_{2j}$. The step 114 is followed by the step 104.

If it has not been possible to correct either the value $D_{1j}$ or the value $D_{2j}$, then, in a step 116, the computer 32 establishes that the data item is lost since the latter is erroneous and cannot be corrected. In this step 116, the computer 32 marks the memory blocks $B_{1j}$ and $B_{2j}$ as being faulty. This operation is performed with respect to the step 90. Next, either the program is capable of managing the absence of value for this data item, and in that case the execution of the program continues. If the execution of the program cannot continue without the value of the data item, then the execution of the program is stopped and the security processor is for example restarted.

Figure 5:
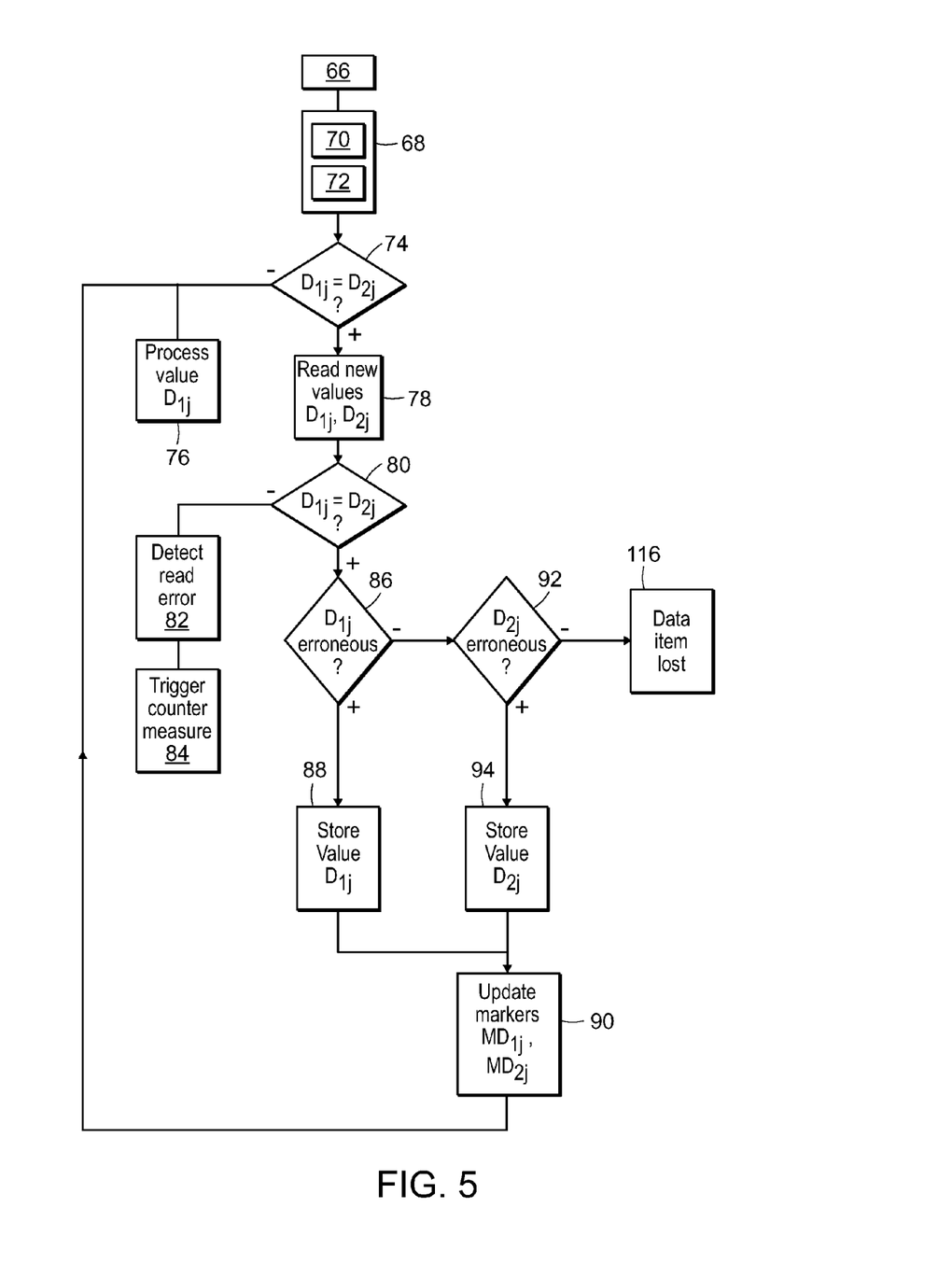
FIG. 5 is a flowchart of another embodiment of a method for protecting the security processor in FIG. 1.

FIG. 5 represents a method for protecting the processor 16 identical to the method in FIG. 4 except that the error-correcting codes are not used. Thus, in this method, the steps 98 to 114 are omitted. Moreover, in the case where the values $D_{1j}$ and $D_{2j}$ are both detected as being erroneous, the step 116 follows directly.

Many other embodiments are possible. For example, the operations of transformation of the stored value can be omitted. In this case, the steps 56 and 72 are omitted.

The allocation of memory can be a logical or physical allocation of memory.

The algorithm used for detecting an error in the value $D_{1j}$ can be different from the algorithm used for detecting an error in the value $D_{2j}$. In that case, the values of the codes $CD_{1j}$ and $CD_{2j}$ are different.

In a variant, the error detecting code is also used after the correction of the stored value using the error-correcting code. This makes it possible to verify, if necessary, that the corrected value is correct.

In another variant, the code $CC_0$ is omitted, or conversely, the codes $CC_1$ and $CC_2$ are omitted or no error-correcting code is used.

In another variant, an error-correcting code is used only for a single one of the memory areas.

The error-correcting code is not necessarily common to a whole memory area. In a variant, the error-correcting code is constructed for a restricted group of several blocks of a memory area. An error-correcting code can also be constructed for each memory block and for this memory block only. In that case, the error-correcting code preferably replaces the error detecting code. Indeed, almost all the error-correcting codes also allow for the detection of an error.

The error-correcting code can also be common to the values $D_{1j}$ and $D_{2j}$.

The error-correcting code can also be constructed according to other algorithms such as the Hamming algorithm or a turbocode.

When a memory block $B_{1j}$ is detected as being faulty, it is not necessary for the memory block $B_{2j}$ that is paired with it also to be systematically marked as also being faulty. In a variant, the block $B_{2j}$ is marked as being faulty only if the code $CD_{2j}$ associated with this block confirms that the data item that it contains is also erroneous. In the opposite case, a table associates with the address of each block $B_{1j}$ the address of the paired block $B_{2j}$. In that case, this table is modified to associate, at the address of the block $B_{2j}$, a new block used to replace the preceding block $B_{1j}$.

The control area 42 can be stored in the blocks of the area 44. In these conditions, like all the blocks of this area 44, it is duplicated in the area 46. This therefore makes it possible to protect the control area against the corruption of data or reading errors in the same way as any other block of these areas 44 and 46.

The transformation of the value $D_{ij}$ into a value $D'_{ij}$ can be omitted or implemented for only one of the areas 44 or 46.

The order of certain operations or steps of the methods described here can be modified. For example, the computation of the error detecting code is performed after the transformation of the value $D_{ij}$ into a transformed value $D'_{ij}$. In that case, during the reading, the verification that the read data item is correct or erroneous is performed on the basis of the value $D'_{ij}$ and not the value $D_{ij}$.

In a variant, before updating the marker $MD_{ij}$ of a faulty block, the computer verifies that the block $B_{ij}$ actually is faulty. For example, it performs the following operations:

α) Writing of a value $D_{ij}$ in the block $B_{ij}$ in question, then

β) Reading of the value $D_{ij}$ stored in this block $B_{ij}$,

χ) Comparison of the written and read values, and then

δ) If these values are equal, the operations a) to c) are repeated at least N times.

Otherwise, the marker $MD_{ij}$ is updated to indicate that the block $B_{ij}$ is faulty.

Typically, the number N is greater than two and, preferably, greater than ten.

If the preceding operations a) to d) are often implemented for one and the same block $B_{ij}$ but the preceding verification leads each time to the block $B_{ij}$ being left usable, a particular value can be allocated to the marker $MD_{ij}$ indicating that this block $B_{ij}$ is not very secure. In these conditions, as far as possible, the block $B_{ij}$ is then not chosen for storing new data. On the other hand, if there are no longer any other memory blocks available that are more secure, this block $B_{ij}$ will then be used to store a data item.

Each of the memories described here can be produced in the form of a single electronic component or an association of several electronic components attached independently from one another to the computer 32. For example, the areas 44 and 46 can correspond to two physically separate memories each linked by its own reading bus to the computer 32.

More than two redundant memory areas can be implemented. In this case, the value of the data item copied in this memory is copied in each of these memory areas. The methods described above can easily be adapted to the case of W memory areas where W is an integer strictly greater than two.

The subject of the preceding description is also applicable to a non-volatile memory.

The invention claimed is:

1. A method for protecting a security processor from a potential reading attack by detecting an error in the reading of a data item, said method comprising: (a) storing a first copy of the data item in a first area of an electronic memory and storing a second copy of the data item in a second area of an electronic memory, in response to a request to read the data item (b) reading a value of the first copy and a value of the second copy of the data item from the first and second areas, respectively, (c) comparing the read values of the first and second copies of the data item, (d) wherein, if the read values of the first and second copies are identical, then no error in the reading of this data item is detected, (e) wherein if the read values of the first and second copies are different, then steps (b) and (c) are repeated, wherein if the values read in step (e) are identical, then an error in the reading of the data item is detected, said error indicating a potential reading attack, and wherein, if the values read in step (e) differ, no error in the reading of the data item is detected.

2. The method of claim 1, further comprising associating an error-detecting code with the value of the first copy of the data item, said error-detecting code adding redundancy to the data item and making it possible to detect an error in the value of said data item, if the read values of the first and second copies differ, using the error-detecting code associated with the value to verify whether the read value of the first copy is erroneous or, on the contrary, correct, and if the read value of the first copy is correct, storing the value of the first copy in a memory block of the second memory area that is different from the memory block in which the preceding second copy of this data item was found, thereby forming a new second copy of the data item, followed by using said new second copy instead and in place of the preceding second copy of the data item in any subsequent iteration of steps (b) and (c).

3. The method of claim 1, further comprising associating an error-correcting code with the first and second copies of the data item, said error-correcting code-adding enough redundancy to the values of the first and second copies to make possible correction of one or more erroneous bits in the value of each copy of the data item, if in step f), the read values of the first and second copies differ correcting, using the error-correcting code of the values of the first and second copies of the data item, the first and second copies to obtain corrected values for said first and second copies, comparing the corrected values of the first and second copies, and if the corrected values are identical, storing the corrected value of the first copy of the data item in new memory blocks, from, respectively, first and second memory areas different from the memory blocks in which the preceding first and second copies of the data item were found, so as to form new first and second copies of the data item, then, after having done so, using the new first and second copies instead and in place of the preceding first and second copies in any new iteration of steps (b) and (c).

4. The method of claim 2, further comprising, for each memory block in which a preceding copy of the data item was found mark the memory block as being faulty, and upon the allocation of a new memory block in one of the memory areas in which to store an information item, choosing the memory block only from among the memory blocks of the area that have not been marked as being faulty.

5. The method of claim 3, wherein, for each memory block in which a preceding copy of the data item was found, marking the memory block as being faulty, and upon allocation of a new memory block in one of the memory areas in which to store an information item, choosing the memory block, only from among the those memory blocks of the area that have not been marked as being faulty.

6. The method of claim 1, wherein, upon storing of the first copy of the data item, the value of the data item is first transformed using a reversible masking function to obtain a transformed value that differs from both the non-transformed value and from the stored value of the second copy, whereby it is the transformed value that is stored in the first area, and, upon reading of the first copy, the inverse transformation is applied to the stored transformed value to obtain the read value of the first copy.

7. A method for protecting a security processor from a reading attack, wherein the security processor executes a routine for enciphering or deciphering an information item using a confidential data item stored in first and second memory areas of the security processor, said method comprising detecting an error in the reading of the confidential data item, wherein detecting said error comprises (a) storing a first copy of the data item in a first area of an electronic memory and storing a second copy of the data item in a second area of said electronic memory, in response to a request to read the data item (b) reading a value of the first copy and a value of the second copy of the data item from the first and second areas, respectively, (c) comparing the read values of the first and second copies of the data item, (d) wherein, if the read values of the first and second copies are identical, then no error in the reading of the data item is detected, and wherein, (e) if the read values of the first and second copies are different, then the preceding steps (b) and (c) are repeated, wherein, if the values read in step (e) are identical after having repeated steps (b) and (c), then an error in the reading of the data item is detected, wherein, if the values read in step (e) after having repeated steps (b) and (c) differ, no error in the reading of the data item is detected, wherein, if no error in the reading of the confidential data item is detected, the security-processor continues with the enciphering or deciphering of the information item using the read confidential data item, and wherein, if an error in the reading of the confidential data item is detected, the security processor automatically-triggers a countermeasure limiting the enciphering or deciphering of the information item using the read confidential data item, with respect to the case where no error in the reading of the confidential data item is detected.

8. A manufacture comprising non-transitory computer-readable medium in a security microprocessor, said computer-readable medium having encoded thereon software for protecting the security microprocessor from a reading attack, the security microprocessor executing a routine of enciphering or deciphering an information item using a confidential data item stored in first and second memory areas of the security microprocessor, the software comprising instructions for causing the security microprocessor to detect an error in the reading of the confidential data item, by (a) storing a first copy of the data item in a first area of an electronic memory and storing a second copy of the data item in a second area of an electronic memory, and in response to a request to read the data item: (b) reading a value of the first copy and a value of the second copy of the data item in the first and second areas, respectively, (c) comparing the read values of the first and second copies of the data item, (d) if the read values of the first and second copies are identical, determining that no error in the reading of the data item has been detected, and (e) if the read values of the first and second copies are different, repeating steps (b) and (c), and, if after having repeated said steps, the values read in step (e) are identical, detecting an error in the reading of the data item and, otherwise, determining that no error in the reading of the data item has been detected, wherein, if no error in the reading of the confidential data item is detected, the security microprocessor continues with the enciphering or deciphering of the information item using the read confidential data item, otherwise, in response to the detection of a reading error, the security microprocessor automatically triggers a countermeasure limiting the enciphering or deciphering of the information item using the read confidential data item, with respect to the case where no error in the reading of the confidential data item is detected.

9. An apparatus comprising a security microprocessor, said security microprocessor comprising an electronic memory comprising first and second areas, and an electronic computer programmed (a) to store a first copy of the data item in the first area and a second copy of the data item in the second area, and, in response to a request to read the data item: (b) to read the values of the first and second copies of the data item in the first and second areas respectively, (c) to compare the read values of the first and second copies of the data item, and (d) if the read values of the first and second copies are identical, to then detect absence of an error in the reading of the data item, (e) if the read values of the first and second copies are different, to repeat the preceding steps (b) and (c), after having done so, and if the values read in step (e) are identical, to detect an error in the reading of the data item, the error indicating a potential reading attack and, if the values read in step (e) are different, to indicate no reading error.

10. The apparatus of claim 9, further comprising a smartcard, wherein the security microprocessor is the security microprocessor of said smartcard.

11. The manufacture of claim 8, wherein the electronic memory comprises a first memory, which is non-volatile, and a second memory, which is volatile, wherein the data read in the first memory are systematically copied in order to be processed by the electronic computer.

12. A method comprising protecting a security processor from a potential reading attack, wherein protecting said security processor comprises detecting an error in reading a data item, wherein detecting said error comprises determining that a first copy of a data item and a second copy of said data item have become identical to each other, and, based on said fact that said first and second copies of said data have become identical to each other, identifying an error condition, said error condition being indicative of a potential reading attack, wherein determining that a first copy of data and a second copy of data have become identical to each other comprises storing a first copy of said data item in a first area of said electronic memory and storing a second copy of said data item in a second area of said electronic memory, in response to a request to read said data item, reading a value of said first copy and a value of said second copy of said data item from said first and second areas, respectively, comparing said read values of said first and second copies of said data item, determining that said read values of said first and second copies differ, after having determined that said first and second copies differ, reading said value of said first copy and said value of said second copy of said data item in said first and second areas, respectively, determining that said read values of said first and second copies are identical, and as a result of said first and second copies having become identical after having been different, detecting that there has been an error in said reading of said data item and that said error in said reading of said data item is a potential reading attack, wherein said security processor comprises a processing element, an electronic memory, and a communication link between said electronic memory and said processing element.

* * * * *